Aug. 5, 1958  P. W. COOK  2,845,811
LARGER STEERING WHEEL ATTACHMENT
Filed Nov. 9, 1955
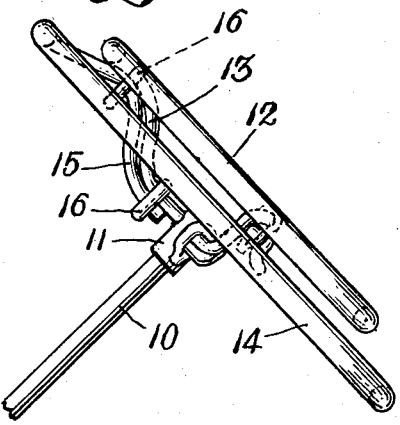
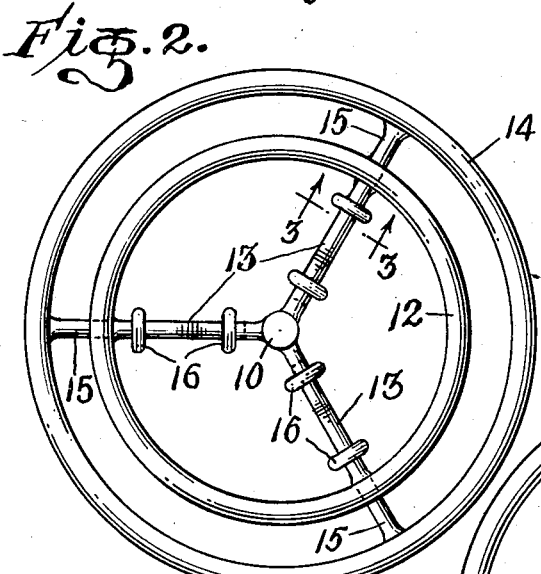
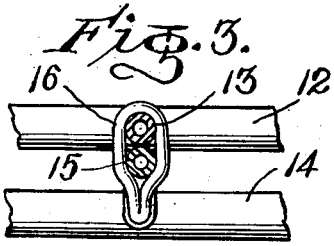
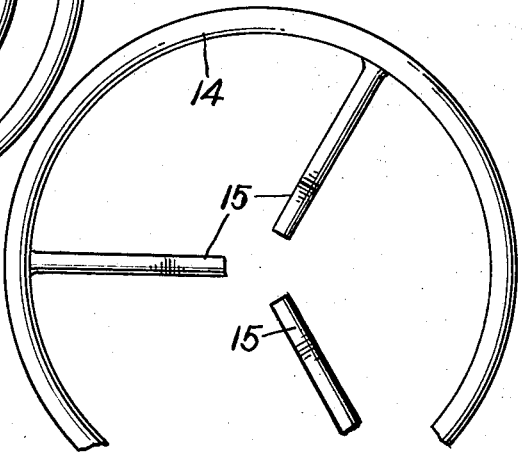
INVENTOR.
Paul W. Cook

United States Patent Office 2,845,811
Patented Aug. 5, 1958

2,845,811

LARGER STEERING WHEEL ATTACHMENT

Paul W. Cook, Adrian, Minn.

Application November 9, 1955, Serial No. 545,896

3 Claims. (Cl. 74—494)

This invention relates to steering wheel attachments.

It is an object of the present invention to provide a larger steering wheel attachment which may be easily and readily mounted on the conventional steering wheel of tractors or the like without the necessity of removing the regular wheel and which will increase materially the diameter of the steering wheel to provide easier steering.

It is another object of the present invention to provide a larger steering wheel attachment of the above type which will provide easier steering at a much lower cost than power steering, or other steering aids and which may be easily made to fit most tractors.

It is another object of the present invention to provide a steering wheel attachment of the above type which is particularly adapted for farm tractors with heavy equipment, wide wheel settings, dual front wheel attachment and rough ground.

For other objects and a better understanding of the invention, reference may be had to the following detailed description taken in connection with the accompanying drawing, in which:

Figure 1 is a side elevational view of a conventional steering wheel showing the invention in operative use thereon;

Fig. 2 is a top plan view thereof;

Fig. 3 is an enlarged transverse sectional view taken along the line 3—3 of Fig. 2; and Fig. 4 is a top plan view of the larger steering wheel attachment shown alone.

Referring now more in detail to the drawing, 10 represents the usual steering post of a tractor or the like on the upper end of which is mounted the hub 11 of a conventional steering wheel 12 having the usual angularly spaced spokes 13, substantially as illustrated.

In the practice of my invention, a larger steering wheel attachment is provided and includes the ring shaped or circular rod 14 of greater diameter than the steering wheel 12 (Fig. 4), the wheel 14 being provided with the three equiangularly spaced, inwardly extending spokes 15, the inner ends of which are freely spaced apart and from the hub 11. As shown in Fig. 1, the spokes 15 are curved upwardly and outwardly and then downwardly and outwardly and adapted to be positioned directly below the correspondingly or similarly shaped spokes 13 of the conventional steering wheel, with the inner ends of the spokes 15 terminating short of the hub 11. A pair of cable clamps 16, or other suitable fastening means are provided for fixedly connecting each of the spokes 13 with the corresponding spoke 15 of the larger steering wheel attachment. It will be noted that the larger steering wheel attachment 14, 15 is mounted below the conventional steering wheel 12 and may be mounted or removed without the necessity of removing the conventional wheel.

It should now be apparent that there has been provided a larger steering wheel attachment which provides easier steering at a much lower cost than power steering or steering aids and which can be easily made to fit most tractors. It should also be apparent that there has been provided a larger steering wheel attachment of the above type which is particularly useful for farm tractors or heavy equipment, wide wheel settings, dual front wheel attachment and rough ground.

While various changes may be made in the detail construction, it shall be understood that such changes shall be within the spirit and scope of the present invention as defined by the appended claims.

What I claim as new and desire to protect by Letters Patent of the United States is:

1. A larger steering wheel attachment for steering wheels of tractors or the like comprising a ring shaped rod of greater diameter than the steering wheel, and means for mounting said ring shaped rod below the conventional steering wheel, comprising a plurality of equiangularly spaced spokes fixedly carried by said ring shaped rod and extending inwardly thereof to terminate at their ends in freely spaced relationship to each other and to the steering wheel hub, said spokes being adapted to underlie and be connected to the conventional steering wheel spokes, and means connecting the spokes of said ring shaped rod to the conventional steering wheel spokes.

2. A larger steering wheel attachment according to claim 1, said last mentioned means comprising cable clamps longitudinally spaced and connecting each of said regular steering wheel spokes with said attachment spokes.

3. A larger steering wheel attachment according to claim 2, three equi-angularly spaced spokes being provided for said ring shaped rod with their inner ends freeely spaced from the conventional hub of the steering wheel, said spokes being curved upwardly and outwardly and downwardly and outwardly and adapted to underlie the correspondingly shaped spokes of the conventional steering wheel, two cable clamps being provided for connecting each of said conventional steering wheel and attachment spokes.

References Cited in the file of this patent

UNITED STATES PATENTS

| | | |
|---|---|---|
| 1,229,865 | Bates | June 12, 1917 |
| 1,246,244 | Davis | Nov. 13, 1917 |
| 1,323,680 | Davidson | Dec. 2, 1919 |
| 1,726,459 | Thomas | Aug. 27, 1929 |
| 2,347,135 | Smith | Apr. 18, 1944 |
| 2,470,273 | Von Uffel | May 17, 1949 |